United States Patent
Rouhart

(10) Patent No.: US 12,457,377 B2
(45) Date of Patent: Oct. 28, 2025

(54) DEVICE AND METHOD FOR SYNCHRONISED AUDIO-VIDEO REPRODUCTION

(71) Applicant: SAGEMCOM BROADBAND SAS, Rueil Malmaison (FR)

(72) Inventor: Guillaume Rouhart, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 140 days.

(21) Appl. No.: 18/084,304

(22) Filed: Dec. 19, 2022

(65) Prior Publication Data
US 2023/0199242 A1    Jun. 22, 2023

(30) Foreign Application Priority Data
Dec. 20, 2021   (FR) ..................... 2114048

(51) Int. Cl.
*H04N 21/43* (2011.01)

(52) U.S. Cl.
CPC ............... *H04N 21/4307* (2013.01)

(58) Field of Classification Search
CPC .. H04N 5/60; H04N 21/4307; H04N 21/2368; H04N 21/4392; H04N 21/242; H04N 21/43; H04N 21/4302; H04N 21/439; H04R 2499/15; H04R 3/00; H04W 56/0015; G06V 20/59; G06V 10/25; G06V 20/70; G06V 10/761; G06V 2201/07

USPC ..................................................... 348/148
See application file for complete search history.

(56) References Cited

U.S. PATENT DOCUMENTS

| | | |
|---|---|---|
| 2005/0281255 A1 | 12/2005 | Davies et al. |
| 2014/0259050 A1* | 9/2014 | Goldberg ......... H04N 21/43076 725/32 |
| 2017/0127093 A1* | 5/2017 | Tsukagoshi ........ H04N 21/4341 |
| 2018/0077443 A1 | 3/2018 | Lau et al. |
| 2018/0317192 A1 | 11/2018 | Daley et al. |
| 2021/0258630 A1* | 8/2021 | Olekas ............. H04N 21/44008 |

FOREIGN PATENT DOCUMENTS

EP    3840388 A1    6/2021

* cited by examiner

*Primary Examiner* — Thai Q Tran
*Assistant Examiner* — Nienru Yang
(74) *Attorney, Agent, or Firm* — MUNCY, GEISSLER, OLDS & LOWE, P.C.

(57) ABSTRACT

Audio-video broadcasting equipment receiving an audio-video stream includes an inbound audio stream and an inbound video stream and connected to audio reproduction equipment via a one-directional audio link and via a communication link. The equipment includes a first processing unit arranged to introduce identification data in the inbound audio stream to produce an outbound audio stream; transmit said audio stream to the audio reproduction equipment via the one-directional audio link, such that said audio reproduction equipment reproduces said outbound audio stream; receive, via the communication link, an audio latency value induced by the audio reproduction equipment; synchronise an outbound video stream, produced from the inbound video stream, with the outbound audio stream by using the latency value, and reproduce the outbound video stream.

16 Claims, 1 Drawing Sheet

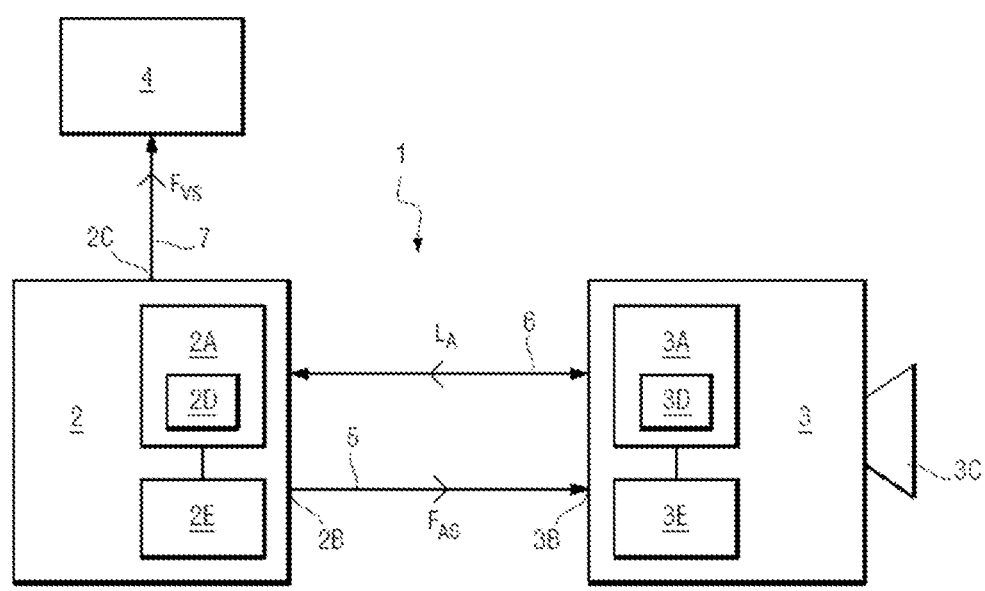

DEVICE AND METHOD FOR SYNCHRONISED AUDIO-VIDEO REPRODUCTION

The invention relates to the field of synchronised audio-video reproduction.

BACKGROUND OF THE INVENTION

A multimedia system conventionally comprises audio-video broadcasting equipment, for example a set-top box, and audio reproduction equipment, for example an audio speaker, connected to one another via a one-directional audio link (analogue or digital).

The audio-video broadcasting equipment thus broadcasts an audio-video stream comprising a video stream and an audio stream. Generally, the audio-video broadcasting equipment reproduces the video stream (for example, by a television) and the audio stream is reproduced by the audio reproduction equipment. In such a case, it is essential to correctly synchronise the audio stream and the video stream.

It is known to be able to manually adjust a delay or an advance of the audio stream, via for example, a cursor located on the audio-video broadcasting equipment. However, this is a solution which is not very easy for a user.

It is also known that the audio-video broadcasting equipment and the audio reproduction equipment share a reference clock. In this case, the audio-video broadcasting equipment transmits the audio stream, by integrating timestamp information thereto (for example, an RTP timestamp). The timestamp information thus makes it possible to synchronise the audio stream and the video stream. However, this is a solution which involves implementing complex exchanges between the two pieces of equipment (definition of a reference clock, detection of an audio calibration sample, implementation of a programming interface to decode the timestamp information). In addition, it requires an installation and configuration step, during which it will not be possible to use the equipment. There will therefore be an interruption of the service. Finally, the installation and configuration step is started on the initiative of the user and is therefore not carried out automatically.

OBJECT OF THE INVENTION

An object of the invention is to synchronise simply, without interruption of service and without intervention of a user, a video stream and an audio stream coming from an audio-video stream, the audio stream being transmitted by the audio-video broadcasting equipment to an audio reproduction equipment for its reproduction.

SUMMARY OF THE INVENTION

In view of achieving this object, audio-video broadcasting equipment is proposed, arranged to receive an audio-video stream comprising an inbound audio stream and an inbound video stream, the audio-video broadcasting equipment being intended to be connected to audio reproduction equipment via a one-directional audio link and via a communication link, the audio-video broadcasting equipment comprising a first processing unit, arranged to:

introduce identification data in the inbound audio stream to produce an outbound audio stream, the identification data comprising at least one identifier of the audio-video broadcasting equipment;

transmit said outbound audio stream to the audio reproduction equipment via the one-directional audio link, such that said audio reproduction equipment reproduces said outbound audio stream via at least one speaker;

receive, via the communication link, an audio latency value induced by the audio reproduction equipment;

synchronise an outbound video stream, produced from the inbound video stream, with the outbound audio stream, by using the audio latency value, and reproduce the outbound video stream.

The audio-video broadcasting equipment according to the invention is therefore particularly advantageous, as a user simply needs to connect the audio-video broadcasting equipment and the audio reproduction equipment via the one-directional audio link and the communication link, such that the synchronisation of the reproduction of the outbound video stream and of the outbound audio stream is performed. The user is not required to do anything.

Furthermore, the transmission of the identification data via the one-direction audio link and the receipt of the audio latency value via the communication link are simple data exchanges, and which do not require the reproduction of the outbound audio stream and of the outbound audio stream being interrupted.

According to a particular embodiment, the communication link is a communication network, the first processing unit thus being arranged to implement a programming interface and to use the programming interface to receive the audio latency value.

Preferably, the identification data comprise information indicating that the audio-video broadcasting equipment supports the programming interface.

Optionally, the identification data further comprise a network address of said audio-video broadcasting equipment in the communication network.

According to a particular embodiment, the one-directional audio link is an analogue link, the identification data are transmitted by an electric signal having a frequency not belonging to a sound frequency spectrum that is audible for a human ear.

According to a particular embodiment, the audio communication link is a digital link, the identification data are integrated in audio data frames, the identification data being integrated in specific data frames separated from audio data frames integrating audio data of the outbound audio stream.

Advantageously, the first processing unit is arranged to synchronise the outbound video stream with the outbound audio stream by applying, to the inbound video stream, a video delay equal to the audio latency value to produce said outbound video stream.

Optionally, the first processing unit is further arranged to receive an expiration time via the communication link, the expiration time being one hour from which said first processing unit resets the video delay.

Optionally, the first processing unit is arranged to start a counter when the audio latency value is received, the first processing unit being further arranged to reset the video delay, when said counter is in a predetermined state.

Optionally, when the first processing unit has introduced the data for identifying a number of times equal to a predetermined number, without receiving the audio latency value, then said first processing unit resets the video delay.

According to a particular embodiment, the audio-video broadcasting equipment is a set-top box.

The invention also relates to an audio-video broadcasting method, implemented in the first processing unit of audio-video reproduction equipment, such as described above, comprising the steps of:
- introducing the identification data in the inbound audio stream to produce the outbound audio stream, the identification data comprising at least the identifier of the audio-video broadcasting equipment;
- transmitting said outbound audio stream to the audio reproduction equipment via the one-direction audio link, such that said audio reproduction equipment reproduces said outbound audio stream via at least one speaker;
- receiving, via the communication link, the audio latency value induced by the audio reproduction equipment;
- synchronising an outbound video stream, produced from the inbound video stream, with the outbound audio stream by using the latency value, and reproducing the outbound video stream.

The invention also relates to audio reproduction equipment comprising at least one speaker and arranged to be connected to audio-video broadcasting equipment via a one-directional audio link and a communication link, and to reproduce, via the speaker(s), an outbound audio stream which is transmitted to it by the audio-video broadcasting equipment via the one-directional audio link;
the audio reproduction equipment further comprising a second processing unit, arranged to:
- acquire the outbound audio stream;
- extract and decode identification data integrated in the outbound audio stream, the identification data comprising at least one identifier of the audio-video broadcasting equipment;
- transmit an audio latency value induced by said audio reproduction equipment, via the communication link, to the audio-video broadcasting equipment.

Advantageously, the second processing unit is arranged to remove the identification data integrated in the outbound audio stream, such that the audio reproduction equipment does not reproduce said identification data.

According to a particular embodiment, the audio reproduction equipment is an audio speaker.

The invention also relates to an audio reproduction method, implemented in the second processing unit of audio reproduction equipment such as described above, comprising the steps of:
- acquiring the outbound audio stream;
- extracting and decoding the identification data integrated in the outbound audio stream, the identification data comprising at least the identifier of the audio-video broadcasting equipment;
- transmitting the audio latency value induced by said audio reproduction equipment, via the communication link, to the audio-video broadcasting equipment;
- reproducing the outbound audio stream via the speaker(s).

Other features and advantages of the invention will emerge upon reading the following description of particular non-limiting embodiments of the invention.

BRIEF DESCRIPTION OF THE DRAWING

The description of the invention makes reference to accompanying the FIGURE, which represents a multimedia system according to the invention.

DETAILED DESCRIPTION OF THE INVENTION

In reference to the FIGURE, a multimedia system 1 is described, comprising audio-video broadcasting equipment 2 which is, in this case, a set-top box, audio reproduction equipment 3 which is, in this case, an audio speaker, and audio-video reproduction equipment 4 which is, in this case, a television. Below, therefore, the decoder box 2, the audio speaker 3 and the television 4 will be referred to.

The decoder box 2 comprises a first processing unit 2A, an audio output 2B and a video output 2C.

The first processing unit 2A comprises at least one first processing component 2D which can be a DSP (Digital Signal Processor), a processor, a microcontroller, an FPGA (Field Programmable Gate Array), or also an ASIC (Application-Specific Integrated Circuit).

The decoder box 2 further comprises at least one first memory 2E connected to the first processing component(s) 2D. The first memory 2E forms a recording medium which can be read by a computer, on which at least one computer program is recorded, comprising instructions making it possible to implement the audio-video broadcasting method which will be described.

The audio speaker 3 comprises a second processing unit 3A, an audio input 3B and at least one speaker 3C.

The second processing unit 3A comprises at least one second processing component 3D, which can be a DSP (Digital Signal Processor), a processor, a microcontroller, an FPGA (Field Programmable Gate Array), or also an ASIC (Application-Specific Integrated Circuit).

The audio speaker 3 further comprises at least one second memory 3E connected to the second processing component(s) 3D. The second memory 3E forms a recording medium which can be read by a computer, on which at least one computer program is recorded, comprising instructions making it possible to implement an audio reproduction method which will be described.

The decoder box 2 is connected to the audio speaker 3 via a one-directional audio link 5 (from the decoder box 2 to the audio speaker 3). More specifically, the one-directional audio link 5 connects the audio output 2B of the decoder box 2 to the audio input 3B of the audio speaker 3.

The audio output 2B of the decoder box 2 and the audio input 3B of the audio speaker 3 can be analogue audio ports. The one-directional audio link 5 can thus be a coaxial cable with RCA or Jack connectors. The one-directional audio link 5 is naturally used very conventionally to connect a decoder box and an audio speaker and is, in the prior art, dedicated to the transmission of audio signals from the decoder box to the audio speaker.

The audio output 2B of the decoder box 2 and the audio input 3B of the audio speaker 3 can further be digital audio ports (for example, S/PDIF). The one-directional audio link 5 can thus be a coaxial cable with RCA connectors or also an optical fibre with TOSLINK connectors.

The decoder box 2 is further connected to the audio speaker 3 via a communication link 6. The communication link 6 is, in this case, a two-directional link, but could be a one-directional link (from the audio speaker 3 to the decoder box 2). The communication link is itself also used very conventionally to enable a decoder box and an audio speaker to communicate.

The decoder box 2 is further connected to the television 4 via a link 7. More specifically, the link 7 connects the video output 2C of the decoder box 2 to the television 4. The link 7 is, for example, an HDMI (High-Definition Multimedia Interface) cable and the video output 2C is therefore, for example, an HDMI port.

The decoder box 2 is arranged to receive an audio-video stream produced by a source (not represented), which can be, for example, a broadcasting-type or OTT (Over-The- Top)-type source. The audio-video stream comprises an inbound audio stream and an inbound video stream.

The first processing unit 2A of the decoder box 2 is arranged to introduce identification data in the inbound audio stream, in order to produce an outbound audio stream $F_{AS}$. The identification data comprise at least one identifier of the decoder box 2. More specifically, the decoder box 2 comprises audio buffers (not represented) comprising the inbound audio stream in the form of audio samples, which are sent to the first processing unit 2A.

Advantageously, the identification data are introduced, by the first processing unit 2A in the inbound audio stream, via watermarking techniques, and for example, with an audiowmark native code. Watermarking techniques are known and consist of adding information in the inbound audio stream.

The first processing unit 2A of the decoder box 2 is further arranged to transmit the outbound audio stream to the audio speaker 3 via the one-directional audio link 5 (via the audio output 2B) such that said audio speaker 3 reproduces said outbound audio stream.

The audio speaker 3 has an intrinsic audio latency corresponding to the transit time of the outbound audio stream between its receipt on the audio input 3B and its reproduction by the speaker(s) 3C of said audio speaker 3.

The second processing unit 3A of the audio speaker 3 is arranged to acquire the outbound audio stream $F_{AS}$ (received on the audio input 3B of the audio speaker 3 via the one-directional audio link 5) and to extract and decode the identification data integrated in the outbound audio stream by the first processing unit 2A of the decoder box 2.

The second processing unit 3A is further arranged to transmit an audio latency value $L_A$, via the communication link 6, to the decoder box 2. Thus, the first processing unit 2A of the decoder box 2 is arranged to receive, via the communication link 6, the value of the audio latency $L_A$ of the audio speaker 3.

The first processing unit 2A is further arranged to synchronise an outbound video stream $F_{VS}$, produced by said first processing unit 2A from the inbound video stream, by using the audio latency value $L_A$ of the audio speaker 3.

In this case, the first processing unit 2A synchronises the outbound video stream with the outbound audio stream by applying, to the inbound video stream, a video delay equal to the audio latency value to produce said outbound video stream. More specifically, the decoder box 2 comprises video buffers (not represented) comprising the inbound video stream in the form of video samples. The video buffers are configurable—by the first processing unit 2A—and in particular make it possible to delay the inbound video stream according to the audio latency value received via the communication link 6. The first processing unit 2A therefore makes it possible to "delay" the reproduction of the video by the television 4, such that this is synchronised with the reproduction of the audio by the audio speaker 3.

The first processing unit 2A is further arranged to transmit the outbound video stream $F_{VS}$ to the television 4 via the link 7 in order to reproduce said outbound video stream by said television 4.

Furthermore, the first processing unit 2A can also transmit the outbound audio stream to the television 4 via the link 7 in order to reproduce said outbound audio stream by one or more speaker(s) internal to the television 4.

In a particular embodiment of the invention, the communication link 6 is implemented by a communication network—for example, a communication network with a restricted spatial extent (Local Area Network). The decoder box 2 and the audio speaker 3 are thus connected to the communication network (in the same network) and use one same protocol. Conventionally, the audio speaker 3 is connected to the communication network to enable the use of "audio streaming" services or vocal assistance functions. The audio speaker 3 is thus a smart speaker.

The first processing unit 2A is thus arranged to implement a programming interface (API—Application Programming Interface, for example a Websocket or an HTTP server).

The identification data in the outbound audio stream comprise information indicating that the decoder box 2 supports the programming interface, for example an identifier which can be generic or unique. For example, the identifier is a 128-bit UUID (Universally Unique Identifier).

Optionally, the identification data further comprise a network address of the decoder box 2 in the communication network (for example, a 128-bit IPv4 or IPv6 address).

The identification data thus enable the second processing unit 3A of the audio speaker 3 to know that said audio speaker 3 is connected to equipment (in this case, the decoder box 2) supporting the programming interface to synchronise the reproduction of the outbound video stream and of the outbound audio stream.

When the second processing unit 3A of the audio speaker 3 acquires the outbound audio stream and detects the identification data of the decoder box 2, then the programming interface is called (the format of the programming interface implemented by the first processing unit 2A of the decoder box 2 being previously known by the second processing unit 3A of the audio speaker 3):

If the identification data comprise the identifier which is a generic identifier and the network address of the decoder box 2, then the second processing unit 3A of the audio speaker 3 connects directly to the decoder box 2, via the communication link 6 (i.e. the communication network), by using said network address of the decoder box 2.

If the identification data comprise only the identifier which is a unique identifier of the decoder box 2, then the second processing unit 3A of the audio speaker 3 can perform a scan in the communication network to search for the decoder box connected to the communication network responding to the unique identifier, then call the programming interface with the unique identifier (it is down to each decoder box in the communication network to filter the messages which are not intended for them). The second processing unit 3A of the audio speaker 3 can also send a broadcasting-type message over the communication network (once again, it is down to each decoder box in the communication network to filter the messages which are not intended for them).

If the identification data comprise the identifier which is a unique identifier and the network address of the decoder box 2, then the second processing unit 3A of the audio speaker 3 connects directly to the decoder box 2, via the communication link 6 (i.e. the communication network), by using said network address of the decoder box 2.

The first processing unit 2A of the decoder box 2 thus uses the programming interface to receive the audio latency value of the audio speaker 3. Once the audio latency value is received, the first processing unit 2A can synchronise the reproduction of the outbound audio stream and of the outbound video stream.

As indicated above, the identification data can be introduced in the inbound audio stream via watermarking techniques. The choice of the most suitable technique involves being positioned from among a plurality of criteria.

Preferably, the identification data introduced in the inbound audio stream such as compression, filtering (like reverberation), the modification of the audio spectrum or also analogue-digital and digital-analogue conversions.

Advantageously, the identification data are introduced as late as possible in the audio processing chain, i.e. directly upstream from the transmission of the outbound audio stream to the audio speaker 3 (i.e. directly upstream from the audio output 2B of the decoder box 2). By "upstream", this means from the side of the source producing the audio-video stream. Thus, it is preferable that the audio processing applied to the inbound audio stream (for example, by the first processing unit 2A of the decoder box 2) is performed before the introduction of the identification data by said first audio processing unit 2A. The identification data will thus be only affected by analogue-digital and digital-analogue conversion steps. It will thus be possible to use a simple watermarking technique which does not have a very high robustness to audio processing.

Furthermore, transmitting the outbound audio stream via the one-directional audio link 5 with a high data flow rate can affect the reliability of the identification data. For example, in the case for which the identification data comprise a 128-bit UUID identifier and a 128-bit IPv4 or IPv6 network address (of the decoder box 2), then the data flow rate is preferably a conventional flow rate of about 10 bps (bits per second). In this case, the second processing unit 3A of the audio speaker 3 will be able to decode the identification data in less than 30 seconds.

Furthermore, according to the invention, the identification data introduced in the outbound audio stream do not comprise confidential information or which could affect the security of the decoder box 2 and more broadly, the multimedia system 1. However, it is provided that, in the case for which the first processing unit 2A of the decoder box 2 implements the programming interface, access to said programming interface is secure (for example, by using a secure Websocket). Thus, according to the invention, a watermarking technique having a low security level can be used.

Furthermore, in view of the robustness constraints to audio processing, data flow rate and security outlined above, the first processing unit 2A of the decoder box 2 and the second processing unit 3A of the audio speaker 3 do not require to mobilise a calculation power, i.e. significant machine resource.

Furthermore, knowing that the outbound audio stream is reproduced by the speaker 3C of the audio speaker 3, the identification data are also reproduced by said speaker 3C. In the same way, the outbound audio stream (therefore also the identification data) can be reproduced by audio reproduction equipment not integrating the invention (for example, an additional audio speaker connected to an audio output of the decoder box), i.e. equipment not comprising a processing unit arranged to extract and decode identification data—watermarking—and to transmit an audio latency value. For these reasons, the watermarking technique is therefore preferably a technique which hardly affects the audio stream.

Advantageously, the second processing unit 3A of the audio speaker 3 is arranged to remove the identification data integrated in the outbound audio stream, such that said audio speaker 3 does not reproduce said identification data.

Advantageously, the identification data can be transmitted into a sound frequency spectrum that is inaudible by the human ear (for example, beyond 20 kHz or 21 kHz). Generally, the audio stream is filtered to reject the components located outside of the sound frequency spectrum that is audible by the human ear. The identification data can be introduced following this filtering, in frame-form, in an inaudible sound frequency spectrum. It is thus ensured that the identification data are inaudible for a user. Furthermore, knowing that the identification data are distinct from the audio data of the outbound audio stream, it is easy to extract said identification data from said outbound audio stream.

If the one-directional audio link 5 is an analogue link, the identification data can be transmitted by an electric signal having a frequency not belonging to a sound frequency spectrum that is audible for a human ear.

If the one-directional audio link 5 is a digital link, the identification data can be integrated in specific data frames separated from the audio data frames integrating audio data of the outbound audio stream.

For example, if the audio communication link is an S/PDIF digital link, the identification data can be integrated in "user data" data frames, which are directly separated from the audio data. Therefore, no filtering processing is required. The "user data" data frames of an S/PDIF digital link are defined in the IEC 609583 standard, which specifies that the format of "user data" data is not involved (only the way in transmitting said "user data" data is defined). For an S/PDIF digital link, a data block comprises 192 data frames, each data frame comprising two data subframes. A data subframe integrates:

- a preamble making it possible to identify the start of the data block or a data subframe;
- 4 bits of auxiliary data;
- 20 bits of audio data;
- 1 bit of validity making it possible to indicate the integrity and the validity of the data;
- 1 "user bit" bit following 192 data frames forming a "user data" data block;
- 1 bit of channel following 192 data frames forming a "channel status" data block;
- The "user data" data blocks of an S/PDIF link can therefore be used to transmit the identification data to the audio speaker 3 in the case where the one-directional audio link 5 is an S/PDIF digital link.

It is also provided that the first processing unit 2A of the decoder box 2 can reset the video delay following three distinct methods.

According to a first method, the first processing unit 2A is arranged to receive an expiration time (for example, a UTC POSIX time) via the communication link 6, the expiration time being one hour from which said first processing unit 2A resets the video delay.

According to a second method, the first processing unit 2A is arranged to start a counter (for example, a countdown) when the audio latency value is received. When the counter is in a predetermined state (for example, when the countdown has expired), then the first processing unit 2A is further arranged to reset the video delay.

According to a third method, when the first processing unit 2A has introduced the identification data a number of times equal to a predetermined number (for example, twice) without receiving the audio latency value via the communication link 6 (for example, without the programming interface being called), then said first processing unit 2A resets the video delay.

The first processing unit 2A of the decoder box 2 therefore implements an audio-video broadcasting method comprising the steps of:

introducing the identification data in the inbound audio stream to produce the outbound audio stream, the identification data comprising at least the identifier of the decoder box 2;

transmitting said outbound audio stream to the audio speaker 3 via the one-directional audio link 5 such that said audio speaker 3 reproduces said outbound audio stream via the speaker 3C;

receiving, via the communication link 6, the audio latency value induced by the audio speaker 3;

synchronising an outbound video stream, produced from the inbound video stream, with the outbound audio stream by using the audio latency value, and reproducing the outbound video stream.

The second processing unit 3A therefore implements an audio reproduction method comprising the steps of:

acquiring the outbound audio stream;

extracting and decoding the identification data integrated in the outbound audio stream, the identification data comprising at least the identifier of the decoder box 2;

transmitting the audio latency value induced by the audio speaker 3, via the communication link 6, to the decoder box 2;

reproducing the outbound audio stream via the speaker 3C.

The decoder box 2 according to the invention is therefore particularly advantageous, as a user simply needs to connect the decoder box 2 and the audio speaker 3 via the one-directional audio link 5 and the communication link 6, such that the synchronisation of the reproduction of the outbound video stream and of the outbound audio stream is performed. The user is therefore not required to do anything.

Furthermore, the transmission of the identification data via the one-directional audio link 5 and the receipt of the audio latency value via the communication link 6 are simple data exchanges and which do not require interrupting the reproduction of the outbound audio stream and of the outbound audio stream.

Naturally, the invention is not limited to the embodiments described, but comprises any variant entering into the field of the invention, such as defined by the claims.

The audio-video broadcasting equipment is not necessarily a decoder box, but could be another piece of equipment: television, games console, etc.

The audio output 2B of the decoder box 2 can also be a Bluetooth audio output. The one-directional audio link 5 can thus be a wireless link. The audio speaker 3 thus comprises an audio input 3B which is a Bluetooth audio input.

Furthermore, in this case, it has been described that the first processing unit 2A synchronises the outbound video stream with the outbound audio stream by applying, to the inbound video stream, a video delay equal to the audio latency value to produce said outbound video stream; but, it is possible that the first processing unit 2A synchronises the outbound video stream with the outbound audio stream by applying, to the outbound audio stream, an audio advance equal to the audio latency value. The second processing unit 2A of the decoder box 2 could therefore "advance" the audio instead of "delaying" the video.

The invention claimed is:

1. A set top box arranged to receive an audio-video stream comprising an inbound audio stream and an inbound video stream, the set top box being intended to be connected to audio reproduction equipment via a one-directional audio link and via a communication link, the set top box comprising a communication interface for externally connecting the audio reproduction equipment via the one-directional audio link and the communication link, and a first processing unit arranged to:

introduce identification data into the inbound audio stream to produce an outbound audio stream, the identification data comprising at least one identifier of the set top box, the identification data allowing to connect the audio reproduction equipment to the set top box via the communication link;

transmit said outbound audio stream to the audio reproduction equipment via the one-directional audio link, such that said audio reproduction equipment reproduces said outbound audio stream via at least one speaker;

receive, via the communication link, an audio latency value induced by the audio reproduction equipment, the audio latency being transmitted by the audio reproduction equipment to the set top box;

synchronise an outbound video stream, produced from the inbound video stream, with the outbound audio stream, by using the audio latency value, and reproducing the outbound video stream, the first processing unit being arranged to synchronise the outbound video stream with the outbound audio stream by applying, to the inbound video stream, a video delay equal to the audio latency value to produce said outbound video stream.

2. The set top box according to claim 1, wherein the communication link is a communication network, the first processing unit is arranged to implement a programming interface and to use the programming interface to receive the audio latency value.

3. The set top box according to claim 2, wherein the identification data comprises information indicating that said set top box supports the programming interface.

4. The set top box according to claim 3, wherein the identification data further comprises a network address of said set top box in the communication network.

5. The set top box according to claim 1, wherein the one-directional audio link is an analogue link, the identification data is transmitted by an electric signal having a frequency not belonging to a sound frequency spectrum that is audible for a human ear.

6. The set top box according to claim 1, wherein the one-directional audio link is a digital link, and the identification data is integrated in specific data frames separated from the audio data frames integrating audio data of the outbound audio stream.

7. The set top box according to claim 1, wherein the first processing unit is further arranged to receive an expiration time via the communication link, and the expiration time is one hour from which said first processing unit resets the video delay.

8. The set top box according to claim 1, wherein the first processing unit is arranged to start a counter when the audio latency value is received, and the first processing unit is further arranged to reset the video delay when said counter is in a predetermined state.

9. The set top box according to claim 1, wherein, when the first processing unit has introduced the identification data, a number of times equal to a predetermined number, without receiving the audio latency value, then said first processing unit resets the video delay.

10. An audio-video broadcasting method, implemented in the first processing unit of the audio reproduction equipment according to claim 1, comprising the steps of:

introducing the identification data into the inbound audio stream to produce the outbound audio stream, the identification data comprising at least the identifier of the set top box;

transmitting said outbound audio stream to the audio reproduction equipment via the one-directional audio link, such that said audio reproduction equipment reproduces said outbound audio stream via at least one speaker;

receiving, via the communication link, the audio latency value induced by the audio reproduction equipment;

synchronising an outbound video stream, produced from the inbound video stream, with the outbound audio stream by using the latency value, and reproducing the outbound video stream, the synchronisation consisting in applying, to the inbound video stream, a video delay equal to the audio latency value to produce said outbound video stream.

11. A non-transitory computer-readable recording medium which can be read by a computer, on which a computer program is recorded, wherein the computer program comprises instructions which cause the first processing unit of the audio-video broadcasting equipment according to claim 1 to implement an audio-video broadcasting method comprising, introducing the identification data into the inbound audio stream to produce the outbound audio stream, the identification data comprising at least the identifier of the set top box, the identification data allowing to connect the audio reproduction equipment to the set top box via the communication link;

transmitting said outbound audio stream to the audio reproduction equipment via the one-directional audio link, such that said audio reproduction equipment reproduces said outbound audio stream via at least one speaker;

receiving, via the communication link, the audio latency value induced by the audio reproduction equipment, the audio latency being transmitted by the audio reproduction equipment to the set top box;

synchronising an outbound video stream, produced from the inbound video stream, with the outbound audio stream by using the latency value, and reproducing the outbound video stream, the synchronisation consisting in applying, to the inbound video stream, a video delay equal to the audio latency value to produce said outbound video stream.

12. An audio reproduction equipment comprising at least one speaker and arranged to be connected to a set top box via a one-directional audio link and a communication link, and to reproduce via the speaker(s), an outbound audio stream which itself is transmitted by the set top box via the one-directional audio link, the audio reproduction equipment further comprising a communication interface for externally connecting the set top box via the one-directional audio link and the communication link, and a second processing unit arranged to:

acquire the outbound audio stream from the set top box via the one-directional audio link;

extract and decode identification data integrated in the outbound audio stream, the identification data comprising at least one identifier of the set top box, the identification data allowing to connect the audio reproduction equipment to the set top box via the communication link;

transmit an audio latency value induced by said audio reproduction equipment, via the communication link, to the set top box, by using the decoded identification data to connect to the set top box.

13. The audio reproduction equipment according to claim 12, wherein the second processing unit is arranged to remove the identification data integrated in the outbound audio stream, such that the audio reproduction equipment does not reproduce said identification data.

14. The audio reproduction equipment according to claim 12, wherein the audio reproduction equipment is an audio speaker.

15. An audio reproduction method, implemented in the second processing unit of the audio reproduction equipment according to claim 12, comprising the steps of:

acquiring the outbound audio stream;

extracting and decoding the identification data integrated in the outbound audio stream, the identification data comprising at least the identifier of the set top box;

transmitting the audio latency value induced by said audio reproduction equipment, via the communication link, to the set top box, by using the decoded identification data to connect to the set top box;

reproducing the outbound audio stream via the speaker(s).

16. A non-transitory computer-readable recording medium which can be read by a computer, on which a computer program is recorded, wherein the computer program comprises instructions which cause the second processing unit of the audio reproduction equipment according to claim 12 to implement the audio reproduction method comprising the steps of:

acquiring the outbound audio stream;

extracting and decoding the identification data integrated in the outbound audio stream, the identification data comprising at least the identifier of the set top box;

transmitting the audio latency value induced by said audio reproduction equipment, via the communication link, to the set top box, by using the decoded identification data to connect to the set top box;

reproducing the outbound audio stream via the speaker(s).

* * * * *